United States Patent [19]

Iwane

[11] Patent Number: 5,799,214
[45] Date of Patent: Aug. 25, 1998

[54] AUTOFOCUSING DEVICE

[75] Inventor: Touru Iwane, Yokohama, Japan

[73] Assignee: Nikon Corporation, Tokyo, Japan

[21] Appl. No.: 712,413

[22] Filed: Sep. 11, 1996

[30] Foreign Application Priority Data

Sep. 12, 1995 [JP] Japan .................. 7-234095

[51] Int. Cl.$^6$ ............................................. G03B 13/36
[52] U.S. Cl. ........................ 396/135; 396/95; 396/136
[58] Field of Search ........................... 396/89, 95, 96, 396/133, 134, 135, 136, 137

[56] References Cited

U.S. PATENT DOCUMENTS

| | | | |
|---|---|---|---|
| 4,764,787 | 8/1988 | Hamada et al. | 396/96 |
| 4,878,077 | 10/1989 | Maeno et al. | 396/135 |
| 4,894,676 | 1/1990 | Ohnuki et al. | 396/135 |
| 5,059,999 | 10/1991 | Matsuzawa | 396/133 |
| 5,077,571 | 12/1991 | Takayama et al. | 396/134 |
| 5,270,763 | 12/1993 | Ogasawara | 396/96 |
| 5,430,287 | 7/1995 | Kusaka | 396/133 |
| 5,448,051 | 9/1995 | Yamano | 396/95 |
| 5,489,963 | 2/1996 | Imanari et al. | 396/135 |
| 5,572,373 | 11/1996 | Imanari et al. | 396/137 |
| 5,587,762 | 12/1996 | Watanabe | 396/95 |

*Primary Examiner*—Russell E. Adams
*Attorney, Agent, or Firm*—Oliff & Berridge

[57] ABSTRACT

An automatic focusing device according to the present invention includes a lens drive section that drives and automatically focuses a photographing lens, a defocus amount detecting section that detects a defocus amount of the photographing lens, a locus setting section that determines an optimum locus of a characteristic relating to movement of the lens to a target point based upon the defocus amount detected by the defocus amount detecting section, and a control section that controls the lens drive section so as to move the photographing lens along the optimum locus determined by the locus setting section.

10 Claims, 7 Drawing Sheets

FIG. 5

TIME TABLE (TABLE NO. 1)                                    UNIT (ms)

| 1.00 | 2.00 | 3.00 | 4.00 | 5.00 | 6.00 | 7.00 | 8.00 | 9.00 | 10.00 | 11.00 | 12.00 |
|---|---|---|---|---|---|---|---|---|---|---|---|
| 13.00 | 14.00 | 15.00 | 16.00 | 17.00 | 18.00 | 19.00 | 20.00 | 21.00 | 22.00 | 23.00 | 24.00 |
| 25.00 | 26.00 | 27.00 | 28.00 | 29.00 | 30.00 | 31.00 | 32.00 | 33.00 | 34.00 | 35.00 | 36.00 |
| 37.00 | 38.00 | 39.00 | 40.00 | 41.00 | 42.00 | 43.00 | 44.00 | 45.00 | 46.00 | 47.00 | 48.00 |
| 49.00 | 50.00 | 51.00 | 52.00 | 53.00 | 54.00 | 55.00 | 56.00 | 57.00 | 58.00 | 59.00 | 60.00 |

RESIDUAL AMOUNT TABLE (TABLE NO. 2)                         UNIT ($\mu$m)

| 0.02 | 0.18 | 0.59 | 1.39 | 2.69 | 4.62 | 7.29 | 10.81 | 15.29 | 20.83 | 27.54 | 35.52 |
|---|---|---|---|---|---|---|---|---|---|---|---|
| 44.86 | 55.64 | 67.97 | 81.92 | 97.58 | 115.02 | 134.32 | 155.56 | 178.79 | 204.09 | 231.51 | 261.12 |
| 292.97 | 327.11 | 363.59 | 402.45 | 443.74 | 487.50 | 533.76 | 582.54 | 633.89 | 687.82 | 744.36 | 803.52 |
| 865.32 | 929.78 | 996.89 | 1066.67 | 1139.11 | 1214.22 | 1291.99 | 1372.41 | 1455.47 | 1541.15 | 1629.44 | 1720.32 |
| 1813.76 | 1909.72 | 2008.19 | 2109.12 | 2212.48 | 2318.22 | 2426.30 | 2536.68 | 2649.29 | 2764.09 | 2881.01 | 3000.00 |

SPEED TABLE (TABLE NO. 3)                                   UNIT ($\mu$m/ms)

| 0.07 | 0.26 | 0.59 | 1.03 | 1.60 | 2.28 | 3.08 | 3.98 | 5.00 | 6.11 | 7.33 | 8.64 |
|---|---|---|---|---|---|---|---|---|---|---|---|
| 10.05 | 11.54 | 13.13 | 14.79 | 16.54 | 18.36 | 20.26 | 22.22 | 24.26 | 26.35 | 28.51 | 30.72 |
| 32.99 | 35.30 | 37.67 | 40.07 | 42.52 | 45.00 | 47.52 | 50.06 | 52.64 | 55.23 | 57.85 | 60.48 |
| 63.13 | 65.78 | 68.45 | 71.11 | 73.78 | 76.44 | 79.10 | 81.74 | 84.38 | 86.99 | 89.59 | 92.16 |
| 94.71 | 97.22 | 99.71 | 102.15 | 104.56 | 106.92 | 109.24 | 111.50 | 113.72 | 115.87 | 117.97 | 120.00 |

ACCELERATION TABLE (TABLE NO. 4)                            UNIT ($\mu$m/ms$^2$)

| 0.13 | 0.26 | 0.39 | 0.51 | 0.63 | 0.74 | 0.85 | 0.96 | 1.07 | 1.17 | 1.27 | 1.36 |
|---|---|---|---|---|---|---|---|---|---|---|---|
| 1.45 | 1.54 | 1.63 | 1.71 | 1.79 | 1.86 | 1.93 | 2.00 | 2.07 | 2.13 | 2.19 | 2.24 |
| 2.29 | 2.34 | 2.39 | 2.43 | 2.47 | 2.50 | 2.53 | 2.56 | 2.59 | 2.61 | 2.63 | 2.64 |
| 2.65 | 2.66 | 2.67 | 2.67 | 2.67 | 2.66 | 2.65 | 2.64 | 2.63 | 2.61 | 2.59 | 2.56 |
| 2.53 | 2.50 | 2.47 | 2.43 | 2.39 | 2.34 | 2.29 | 2.24 | 2.19 | 2.13 | 2.07 | 2.00 |

AUTOFOCUSING DEVICE

BACKGROUND OF THE INVENTION

1. Field of the Invention

The present invention relates to an autofocusing device for driving and automatically focusing a photographing lens on an object.

2. Description of Related Art

There is known an autofocusing device for driving and automatically focusing a photographing lens on an object. In this type of device, the photographing lens is typically driven and automatically focused by a so-called PID method, in which a duty ratio applied for pulse voltage driving or a drive voltage applied for variable voltage driving are determined by linearly combining the current lens speed, residual drive amount by which the lens is to be moved to a target point, and an integrated value of the residual drive amount, as shown in the following equation (1):

$$p = \alpha V + \beta \cdot \Delta X + \gamma \cdot \int \Delta X dt \qquad (1)$$

where, p is drive force for driving the photographing lens, V is detected current lens speed, $\Delta x$ is residual drive amount up to the target point, and $\alpha$, $\beta$, $\gamma$ are constants.

The above-described drive control method for the photographing lens employed in the conventional autofocusing device involves some problems arising from general properties of cameras and lenses. More specifically, cameras may be used in a wide range of ambient temperature that ranges from a considerably low temperature far below a freezing point, to a high temperature under the blazing in summer. In addition, the attitude of a camera that is being used is varied depending upon an object, and thus not be kept constant. If the photographing lens is driven by a uniform drive method under such varying conditions, therefore, the autofocusing device tends to suffer from environmental influences, making it difficult to achieve a desirable autofocusing operation. Even if a constant duty ratio or a constant drive voltage is applied to a motor, for example, the viscosity resistance of a lubricating oil is varied and an engaged state of gears used in a drive system is also varied due to expansion and contraction thereof as the ambient temperature changes, and the drive force is therefore changed due to changes in the efficiency with which the force is transmitted.

The required drive force may also be changed due to a change in a load to be applied to a drive section of the autofocusing device when a focusing lens system is driven by the drive section either upward or downward depending upon the attitude of the camera. Further, the substantial drive force is changed due to a change in a terminal voltage of a battery as a power supply, or an increase in the internal resistance of the battery with a decrease in the temperature.

In short, the lens drive system is susceptible to various environmental conditions. It is thus extremely difficult to assure constant or steady driving performance or capability, if it is taken into consideration that the photographing lens is actually driven under different conditions than those under which the lens was supposed to be driven upon designing of its drive system.

In the drive control method for driving the photographing lens in the conventional autofocusing device, the above-described influences of the environmental conditions on the actual drive force are basically ignored, and thus variation in the drive force due to environmental changes is not eliminated or excluded. This results in large variation in a length of time required to move the photographing lens only by a predetermined distance.

The variation in the drive capability involves not only the problem related to the time, but also other significant problems. Namely, the lens may not be able to stop at the target point but pass this point depending upon the conditions, causing an overrun phenomenon. Since the drive system or power transmitting system consists of mechanical components, such as gears, the photographing lens cannot be accurately stopped at the target point upon reverse driving after the overrun phenomenon, due to displacement of these components. Consequently, the driving of the photographing lens cannot be accurately completed or terminated.

The variation in the required time for moving the lens to the target point is detrimental to the performance of the camera. While the camera normally takes an exposure step after its focusing operation, the actual exposure timing varies due to the variation in the required lens movement time in the focusing operation, even if the shutter is released at the optimum timing. A camera user may feel uncomfortable with this fluctuation in the shutter release time lag, which may also become a cause of missing the best timing of a shutter operation. In the case of continuous photographing, too, the photographing speed does not become constant due to variation in the environmental conditions.

SUMMARY OF THE INVENTION

It is therefore an object of the present invention to provide an autofocusing device that moves a photographing lens to a target point precisely within a predetermined time while suppressing influences of environmental conditions.

The above object may be accomplished according to the principle of the present invention, which provides an automatic focusing device comprising: a lens drive section that drives and automatically focuses a photographing lens; a defocus amount detecting section that detects a defocus amount of the photographing lens; a locus setting section that determines an optimum locus of a characteristic relating to movement of the photographing lens to a target point, based upon the defocus amount detected by the defocus amount detecting section; and a control section that controls the lens drive section so as to move the photographing lens along the optimum locus determined by the locus setting section.

BRIEF DESCRIPTION OF THE DRAWINGS

The invention will be described in greater detail with reference to certain preferred embodiments thereof and the accompanying drawings, wherein:

FIG. 5 is a view showing tables of the required travel time, residual drive amount, travel speed and acceleration;

DETAILED DESCRIPTION OF THE PREFERRED EMBODIMENTS

Figure 1:
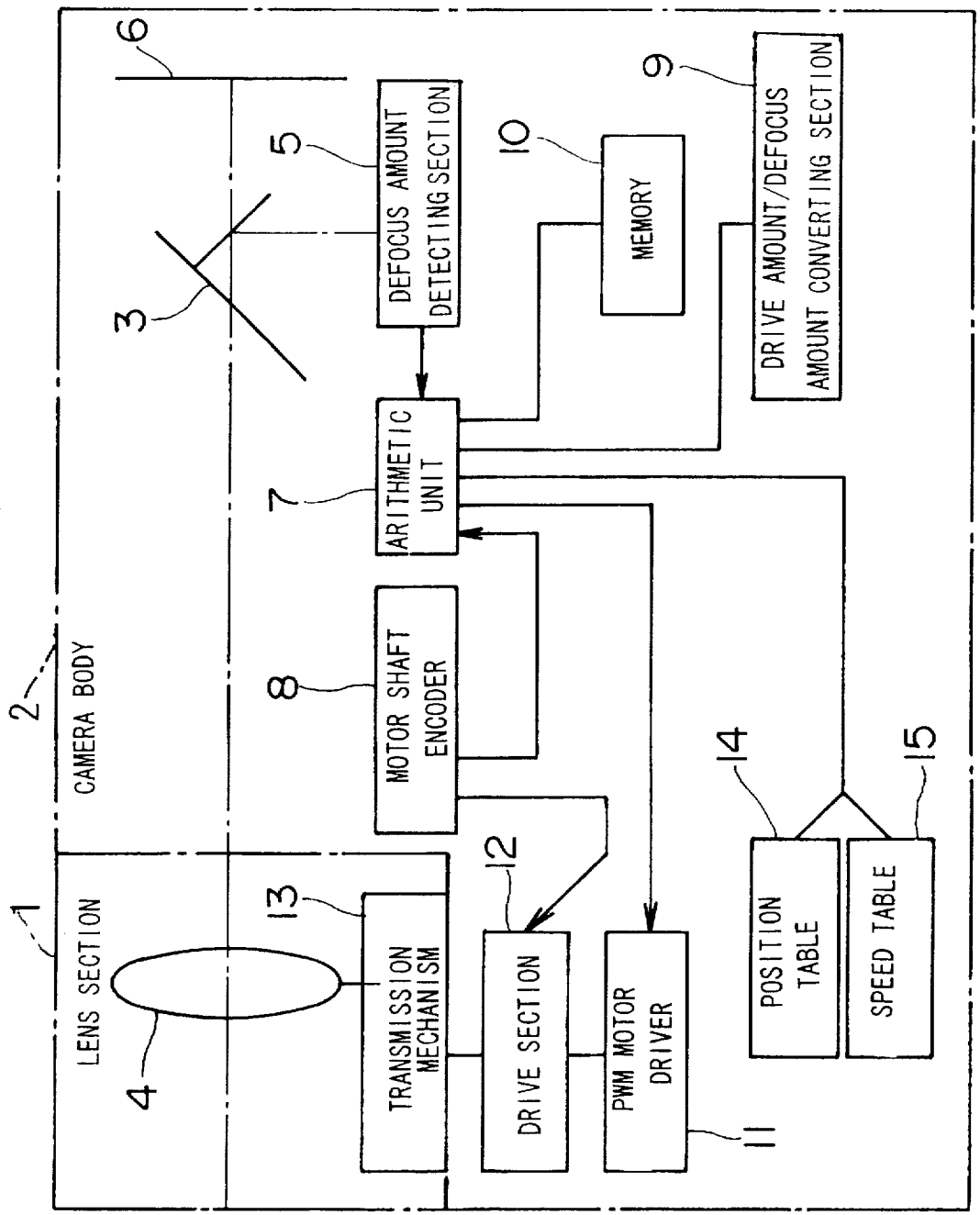
FIG. 1 is a functional block diagram showing the construction of one embodiment of the present invention.

FIG. 1 is a functional block diagram showing the construction of the first embodiment of the present invention.

Referring to FIG. 1, a lens section 1 may be attached to and detached from a camera body 2, and is thus replaceable. A mirror 3 is adapted to guide a portion of a beam of light passing through a photographing lens 4 toward a viewfinder (not shown), and a portion of the light beam toward a defocus amount detecting section 5. The defocus amount detecting section 5 serves to detect a defocus amount, i.e., an amount of deviation of the focal plane of the photographing lens 4 from an expected subject image plane (film surface) 6, and the detected defocus amount is fed to an arithmetic unit 7. In this connection, a travel amount of the photographing lens 4 detected by a motor shaft encoder 8 is represented as the pulse number where one pulse corresponds to a predetermined travel distance. It is therefore advantageous for control of movement of the lens 4 if the defocus amount detected by the defocus amount detecting section 5 is converted into the pulse number of the same unit as used by the encoder 8. To this end, a drive amount/defocus amount converting section 9 converts the defocus amount into a lens drive amount represented by the pulse number. The defocus amount may also be converted into a rotating amount of a motor shaft. The lens drive amount thus converted is stored in a memory 10, and used for lens drive control.

The arithmetic unit 7 consists of a microcomputer, and serves to effect focusing control by implementing a control program which will be described later.

In order to accurately move the photographing lens 4 to a target point within a predetermined travel time while suppressing influences of environmental conditions, the locus of characteristics relating to movement of the photographing lens 4 is determined in this embodiment such that not only the speed but also the acceleration becomes zero at the target point, so as to avoid rapid changes in the position and speed as the lens 4 approaches the target point. The photographing lens 4 is then moved along the locus thus determined. Namely, the locus of characteristics relating to movement of the photographing lens 4 is determined such that the movement of the photographing lens 4 is relatively roughly controlled while it is remote from the target point, and is more subtly or accurately controlled as the lens 4 approaches the target point. A method of calculating the locus will be described later.

Once the drive amount of the photographing lens 4 is determined on the basis of the defocus amount, the lens drive control is initiated, and at the same time an actual travel amount of the photographing lens 4 is monitored by the motor shaft encoder 8.

Where one lens drive control cycle consists of a series of control steps beginning with retrieval of the travel amount of the lens detected by the motor shaft encoder 8 and terminating with output of a motor drive force by means of a PWM motor driver 11, a residual drive amount by which the photographing lens 4 should be driven is calculated for each lens drive control cycle. The initial value of the residual drive amount is equal to the lens drive amount initially stored in the memory 10, and, after the lens 4 starts being driven, the actual lens travel amount detected by the encoder 8 is subtracted from the residual driven amount during each lens drive cycle, so that the residual drive amount is updated.

Subsequently, the target position on the locus to be achieved after a given time and the target speed at this position are determined on the basis of the residual drive amount. These target position and speed may be determined referring to predetermined tables, or arithmetically calculated. A method of determining the target position and target speed will be described later. If the lens drive control cycle as described above is 2 ms, for example, the position on the locus upon a lapse of 2 ms and the speed at this position are determined as target values used for driving the lens. While the target position and target speed are determined each time one drive control cycle ends in the present embodiment, the determination may be made each time a predetermined length of time other than one drive control cycle has elapsed.

Once the target position and target speed are determined, the arithmetic unit 7 calculates errors or differences between these target position and target speed, and the current position and current travel speed that are monitored, and calculates the driving force p by substituting the errors for those in a PD type formula as represented by the following equation (2):

$$p = \alpha(V_p - V) + \beta(X_p - X) \qquad (2)$$

where, Vp is target speed, V is current speed, Xp is target position, X is current position, and α and β are coefficients. The drive force p is an amount representing the duty ratio applied to the motor that is driven by pulse voltage. Since the duty ratio has its upper and lower limits, the duty ratio used for drive control of a drive section 12 consisting of the motor and reduction gears must be controlled so as not to exceed these limits. The motor may be of a type that is driven by variable voltage. In this case, the drive force p is an amount representing the driving voltage.

While the drive force p is calculated according to the above-indicated equation (2) as a combination of the error terms in the form of linear expressions, the method of calculating the drive force p is not limited to that using the equation (2), but may be obtained as a combination of the n-th degree or 1/n-th degree error terms as indicated in the following equation (3):

$$p = \alpha(V_p - V)^{1/n} + \beta(X_p - X)^{1/n} \qquad (3)$$

The drive force p thus calculated is outputted to the PWM motor driver 11. The PWM motor driver 11 generates a PWM signal representing the duty ratio used for pulse voltage drive according to the drive force p, and feeds the PWM signal to the drive section 12 so that the drive section 12 generates the drive force p. The drive force p is then transmitted to the lens section 1 through a transmission mechanism 13 consisting of gears and joints located between a camera body 2 and the lens section 1, so that the photographing lens 4 is driven and automatically focused with the drive force p transmitted thereto through a gear system.

The lens drive control as explained above is repeated until the photographing lens 4 reaches the target point, and the movement of the lens 4 along the initially determined locus is terminated within the predetermined time.

There will be next explained the method of setting the locus of characteristics relating to movement of the photographing lens 4 and the method of determining the target position and target speed.

Initially, in order to accurately move the photographing lens 4 to the target point within the predetermined travel time while suppressing influences of environmental conditions, the locus of characteristics relating to movement of the photographing lens 4 is determined such that not only the speed but also the acceleration becomes zero at the target point, so as to avoid rapid changes in the position and speed as the lens 4 approaches the target point.

Figure 2:
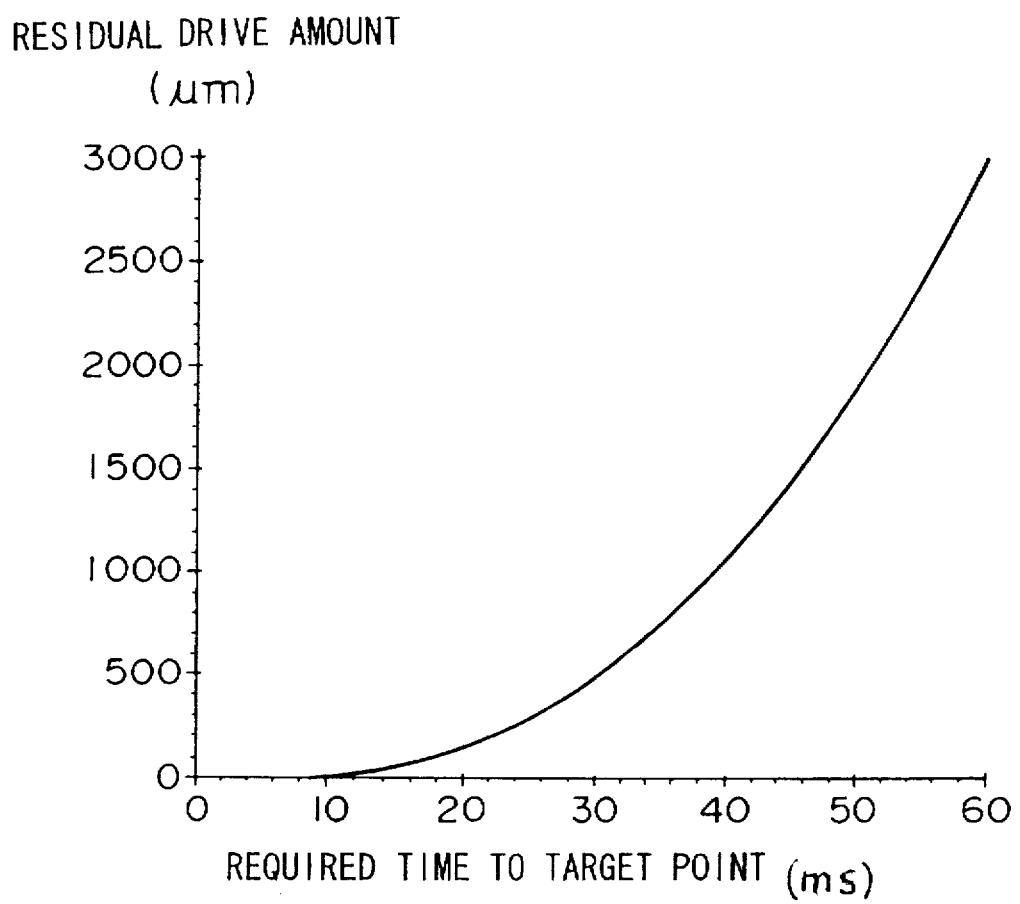
FIG. 2 is a graph showing the relationship between a residual drive amount of a photographing lens and the time required for the lens to move to the target point.

The locus may be calculated according to the equation (4) when the photographing lens 4 is moved 3,000 μm (travel amount) at the maximum speed of 120 μm/ms or lower within a predetermined travel time of 60 ms. The travel amount of the lens 4, which is actually represented by the pulse number, is represented herein by distance for the sake of easy understanding.

$$y=-(t^4/7200)-(t^3/45) \quad (4)$$

where, y is residual drive amount, t is time required for the lens 4 to move from the current position to the target point. The graph of FIG. 2 shows the result of calculation of the residual drive amount obtained according to the equation (4).

The travel speed is then obtained by differentiating the equation (4).

$$dy/dt=-(t^3/1800)-(t^2/15) \quad (5)$$

Figure 3:
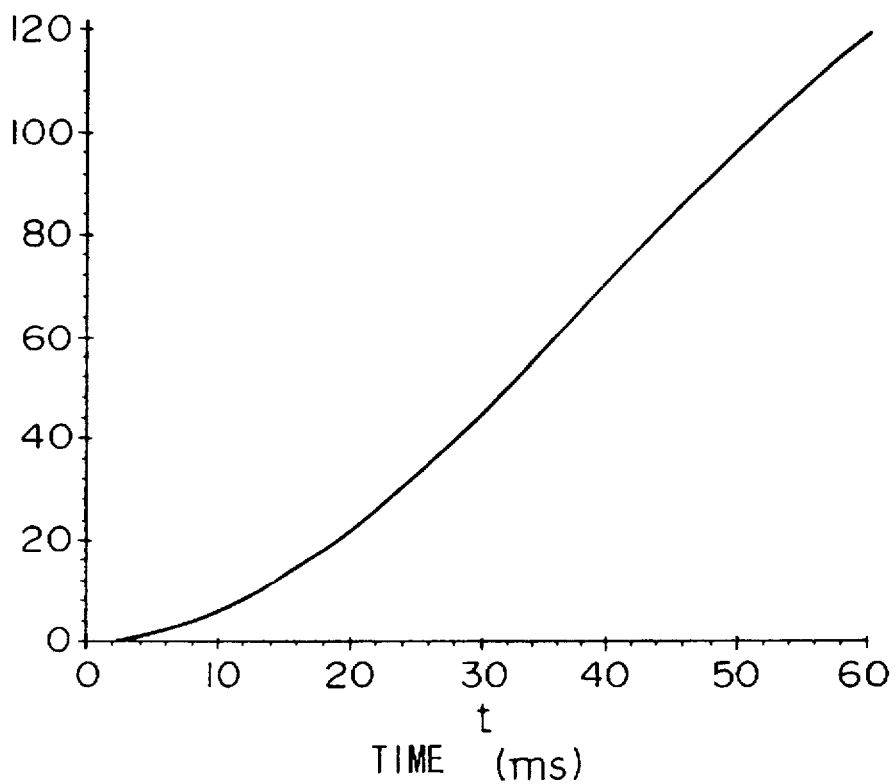
FIG. 3 is a graph showing the relationship between the travel speed of the photographing lens and the time required for the lens to move to the target point.
Figure 4:
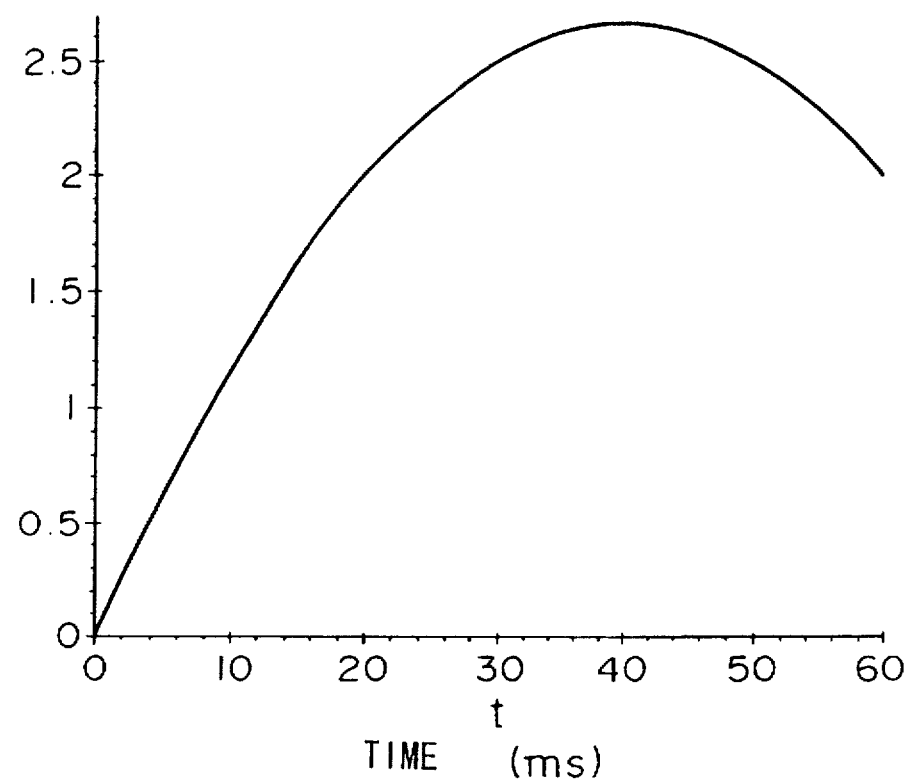
FIG. 4 is a graph showing the relationship between the acceleration of the photographing lens and the time required for the lens to move to the target point.

The graph of FIG. 3 shows the result of calculation of the travel speed according to the above equation (5). The graph of FIG. 4 shows the travel acceleration obtained under the same conditions. As is apparent from the graphs of FIGS. 2–4, the residual driving amount, travel speed and acceleration become close to zero as the current position approaches the target point.

While such expressions as "residual drive amount, travel speed and acceleration of the photographing lens 4" are merely used in the present specification, more accurate meanings of these expressions are the residual drive amount, travel speed and acceleration of a lens (focusing lens) for adjusting the focal point that is included in the photographing lens 4. Upon photographing a stationary object, the travel speed and acceleration of the focusing lens of the photographing lens 4 may be considered as the moving speed and acceleration of the image plane of the photographing lens 4. Upon photographing a moving object, however, the moving speed and acceleration of the object itself are included in the moving speed and acceleration of the image plane of the photographing lens 4, and cares should be thus taken in using these terms.

The photographing lens 4 may be driven while calculating the drive force p according to the above-indicated equations (2)–(5). In the present embodiment, however, the optimum locus of characteristics relating to the movement of the photographing lens 4 to the target point is initially determined based on the travel amount, required travel time and the maximum travel speed of the lens 4, and tables of the residual drive amount, travel speed and acceleration are preliminarily prepared from the determined locus. Then, the lens drive control is effected referring to the thus prepared tables. In this manner, the target position and speed can be determined only by referring to the tables, without requiring the locus to be determined according to the equations (4), (5) each time the defocus amount is detected. This leads to reduction in the burden of a microcomputer and improved response of the lens drive control.

A position table 14 of FIG. 1 is a memory that stores RESIDUAL DRIVE AMOUNT TABLE No. 2 as shown in FIG. 5, and a speed table 15 is a memory that stores TRAVEL SPEED TABLE No. 3 as also shown in FIG. 5. Numeral values in TABLE No. 2 and TABLE No. 3 respectively correspond to those of TABLE No. 1 that represent the time required for the lens 4 to move from the current position to the target point. If the residual drive amount is 2,000 μpm, for example, the required time to move from that position to the target point is supposed to be 51 ms, and the speed at this point of time must be 99.71 μm/ms.

There will be now explained the manner of using the tables in the case where one drive control cycle is 2 ms by way of example.

Initially, the residual drive amount is obtained by subtracting the travel amount of the photographing lens 4 detected by the motor shaft encoder 8 from the lens drive amount. Referring to RESIDUAL DRIVE AMOUNT TABLE No. 2, the required travel time corresponding to this residual drive amount is obtained from TABLE No. 1. In the above case where the residual drive amount is 2,000 μm, 51 ms is selected as the required travel time corresponding to the residual drive amount of 2008.19 μm. Taking account of the next drive control cycle or the time constant of the system with respect to the required travel time, a position that corresponds to the time obtained by subtracting a given time equivalent to the drive control cycle from the required travel time is determined as the target position, and the speed at this position is determined as the target speed. In the present case where one drive control cycle is 2 ms, the target position corresponding to 49 (=51−2) ms is set at 1813.76 μm, and the target speed is set at 94.71 μm/ms.

After the target position and target speed are determined in the above manner, differences between these target values and the current position and current travel speed are obtained and inserted in the above-indicated equation (2) or (3), so as to calculate the duty ratio required to drive the lens. The thus calculated duty ratio is outputted to the PWM motor driver 11, and one cycle of motor drive control is terminated.

Figure 6:
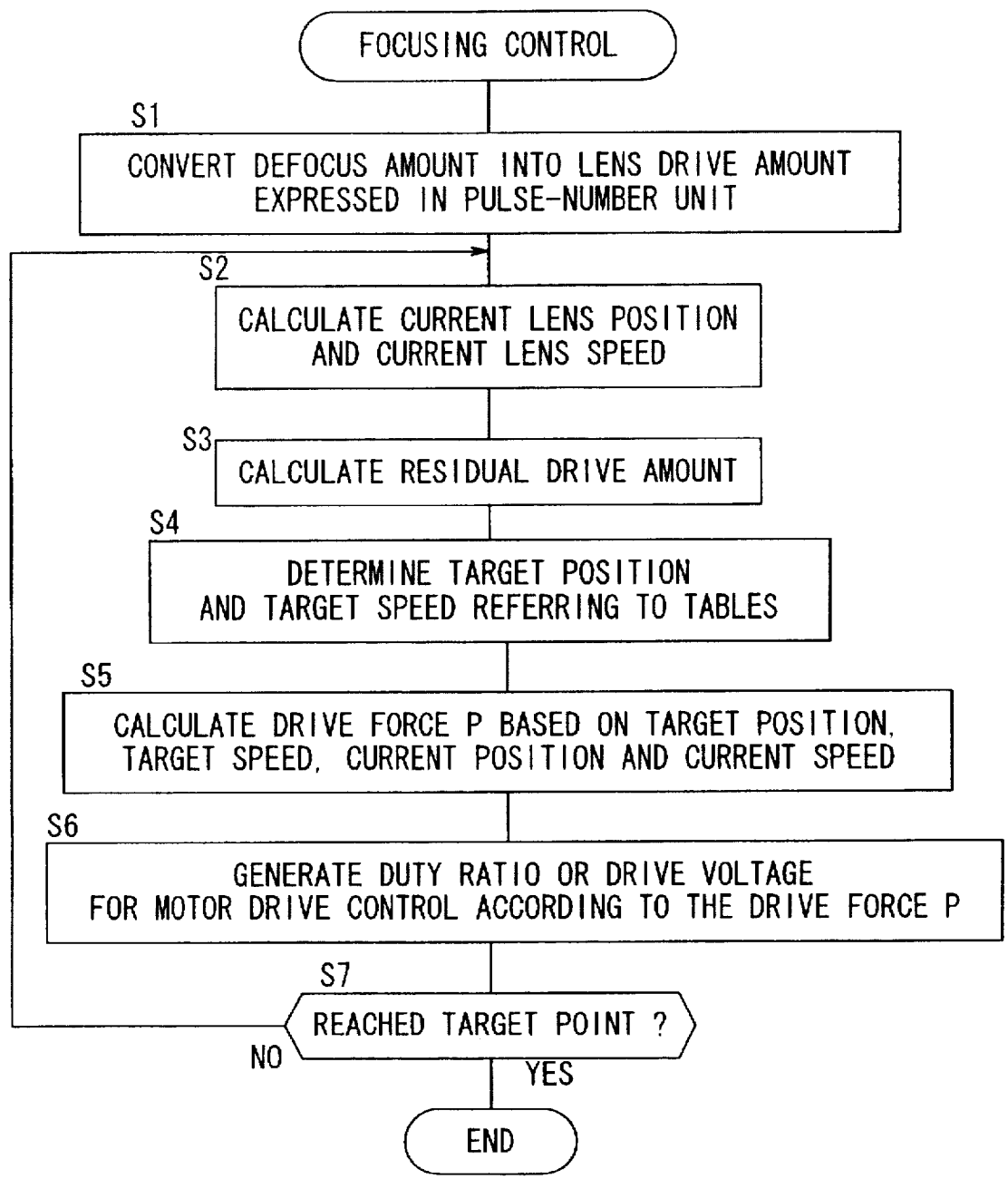
FIG. 6 is a flow chart showing a focusing control program.

FIG. 6 is a flow chart showing a focusing control program implemented by the microcomputer of the arithmetic unit 7. The focusing control of the present embodiment will be explained referring to this flow chart.

The microcomputer of the arithmetic unit 7 initiates implementation of the control program as shown in FIG. 6, when the defocus amount is detected by the defocus amount detecting section 5 and a sequential control section (not shown) generates a command for adjusting the focal point of the photographing lens 4 on the basis of the detected defocus amount. In step S1, the defocus amount detected by the defocus amount detecting section 5 is retrieved, and converted into a lens drive amount expressed in the same pulse-number unit as used by the motor shaft encoder 8. The obtained lens drive amount is stored in the memory 10. In step S2, the current position and current travel speed of the photographing lens 4 are obtained on the basis of the pulse number detected by the motor shaft encoder 8. In step S3, the residual drive amount is calculated by subtracting the actual lens travel amount detected by the motor shaft encoder 8 from the lens drive amount. Since the actual lens travel amount is equal to zero before the lens starts being driven, the initial value of the residual drive amount is equal to the lens drive amount stored in the memory 10 in step S1.

In step S4, the time required for the lens 4 to move to the target point, which corresponds to the residual drive amount, is obtained referring to TIME TABLE No. 1 and RESIDUAL DRIVE AMOUNT TABLE No. 2 as shown in FIG. 5, and the time is determined by subtracting one drive control cycle from the required travel time. Further, the residual drive amount corresponding to the determined time, namely, the target position, is determined referring to RESIDUAL DRIVE AMOUNT TABLE No. 2, and the target speed corresponding to the above-indicated determined time is determined referring to TRAVEL SPEED TABLE No. 3.

In step S5, the current position and current speed detected in step S2, and the target position and target speed determined in step S4 are substituted for those in the equation (2) or (3), so as to calculate the drive force p. In the next step S6, the PWM motor driver 11 is controlled to generate the duty ratio equivalent to the drive force p, so as to drive the drive section 12 in a controlled manner. In step S7, it is determined whether the lens 4 has reached the target point or not, and the routine is terminated when the lens reaches the target point. If not, the control flow goes back to step S2 to repeat the above-described routine until the lens 4 reaches the target point.

Modified Example of the Embodiment

In the illustrated embodiment, most of circuits and equipment needed for drive control of the photographing lens 4 are installed in the camera body 2. There will be explained a modified example of the illustrated embodiment wherein circuits and equipment needed for lens drive control are installed in a lens section.

Figure 7:
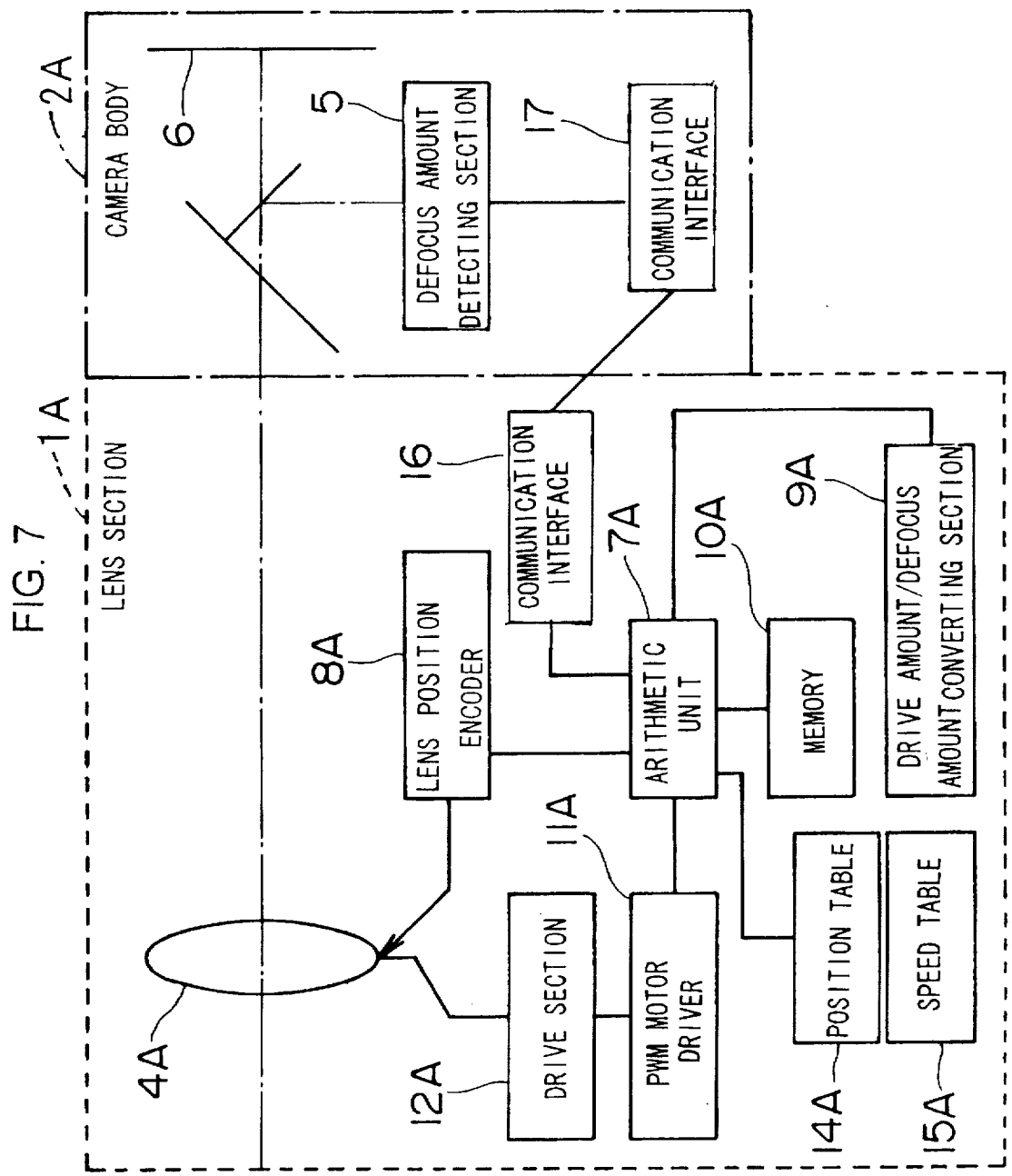
FIG. 7 is a functional block diagram showing the construction of a modified example of the embodiment of FIG. 1.

FIG. 7 is a functional block diagram showing the modified example of the illustrated embodiment of the invention. In this figure, the same reference numerals as used in FIG. 1 are used for identifying the same elements as included in the embodiment of FIG. 1, and "A" is attached to each of the reference numerals used in FIG. 1 for identifying functionally corresponding elements. The same or functionally corresponding elements will not be explained in detail.

In this modified example, circuits and equipment needed for lens drive control other than the defocus detecting section 5 are installed in the lens section 1A. The defocus amount detected by the defocus amount detecting section 5 is fed to the arithmetic unit 7A in the lens section 1A, through communication interfaces 16, 17. The encoder 8A directly detects the travel amount of the photographing lens 4A. While the lens drive force is mechanically transmitted from the camera body 2 to the lens section 1 in the illustrated embodiment, the modified example is constructed such that the lens section 1A incorporating the drive section 12A is electrically connected to the camera body 2A through the communication interfaces 16, 17.

This modified example, which merely different from the illustrated embodiment in the arrangement of the circuits and equipment, performs the same focusing control as shown in FIG. 6, and thus no explanation of the control will be provided. Since most of the lens drive system is disposed in the lens section 1A in the modified example, the resulting autofocusing device is expected to perform a far more rapid AF (autofocusing) operation than a conventional counterpart, if the device is provided with the lens drive control function of the present invention.

In summary, the optimum locus of characteristics relating to movement of the photographing lens 4, 4A to the target point is determined on the basis of the defocus amount of the lens 4, 4A, and the photographing lens 4, 4A is moved along this locus. Thus, the photographing lens 4, 4A can be accurately moved to the target point within a predetermined time even if environmental conditions are varied. In the case of continuous photographing, too, the photographing speed is made constant even with variation in the environmental conditions. Further, the shutter release time lag is less likely to fluctuate when the environmental conditions are varied, assuring accurate exposure timing while eliminating a possibility of missing the best timing of a shutter operation.

The locus is determined on the basis of the defocus amount of the photographing lens 4, 4A so that the travel speed and acceleration of the photographing lens 4, 4A become zero at the target point, and the photographing lens 4, 4A is moved along this locus. This avoids rapid changes in the position and speed of the lens 4 as it approaches the target point, and makes it possible to move the photographing lens 4, 4A to the target point precisely within a predetermined time along the monotonously reducing locus, even with variation in the environmental conditions.

In the illustrated embodiment, the locus is determined on the basis of the defocus amount of the photographing lens 4, 4A, required time to move the lens 4, 4A to the target point, and the maximum travel speed, and the photographing lens 4, 4A is moved along this locus. Thus, the optimum locus to the target point is determined in this manner, and the photographing lens 4, 4A can be moved to the target position along this optimum locus precisely within a predetermined time even if the environmental conditions change.

The target position on the locus that is to be reached after a predetermined time elapses, and the target speed at the target position are determined on the basis of the residual drive amount of the photographing lens 4, 4A, and the driving of the photographing lens 4, 4A is controlled so that the lens 4, 4A passes the target position at the target speed upon the lapse of the predetermined time. Thus, the position on the locus and the speed at this position are subtly and precisely controlled at intervals of the predetermined time, so that the photographing lens 4, 4A can be moved along the locus with high accuracy, so as to reach the target point precisely within the predetermined time even with variation in the environmental conditions.

The photographing lens 4, 4A is driven by the drive force of the drive section 12, which is determined on the basis of the current position and current travel speed of the photographing lens 4, 4A, the target position on the locus to be reached upon lapse of the predetermined time, and the target speed at the target position. More specifically, the drive section 12 is driven with pulse voltage at the controlled duty ratio corresponding to the drive force. Consequently, the drive force applied at intervals of a given time on the locus, namely, the duty ratio, is subtly and precisely controlled, so that the photographing lens 4, 4A can be moved along the locus with high accuracy, so as to reach the target point precisely within the predetermined time even if the environmental conditions are varied.

The tables of the lens position with respect to the travel time and the travel speed at that position are prepared on the basis of the locus, and the photographing lens 4, 4A is moved referring to these tables. This eliminates a need to calculate the locus each time the defocus amount is detected, and makes it possible to determine the target position and the target speed merely referring to the tables, with results of reduced burden of the microcomputer of the arithmetic section 7, and improved response of the microcomputer in effecting the lens drive control.

It is to be understood that the locus is not limited to those as shown in FIGS. 2–4, and the tables of the required time, residual drive amount, travel speed and acceleration are not limited to those as shown in FIG. 5.

What is claimed is:

1. An automatic focusing device comprising:

a lens drive section that drives and automatically focuses a photographing lens a defocus amount detecting section that detects a defocus amount of said photographing lens, a locus setting section that determines an optimum locus of a characteristic relating to movement of said photographing lens to a target point in advance;

a control section that determines a start point on the optimum locus based upon the defocus amount detected by said defocus amount detecting section, and controls said lens drive section to move said photographing lens along the optimum locus from the start point;

a lens drive amount calculating section that calculates a lens drive amount by which said photographing lens is moved to said target point, based upon the defocus amount detected by said defocus amount detecting section;

a lens travel amount detecting section that detects an actual travel amount of the photographing lens;

a residual drive amount calculating section that calculates a residual drive amount of the photographing lens, based upon the lens drive amount calculated by said lens drive amount calculating section and the actual travel amount of the lens detected by said lens travel amount detecting section; and a target value determining section that determines a target position on the locus to be reached when a predetermined time elapses, and a target speed at the target position, based upon the residual drive amount calculated by said residual drive amount calculating section, and wherein said control section controls said lens drive section so that the photographing lens passes said target position at said target speed upon a lapse of said predetermined time.

2. An automatic focusing device according to claim 1, further comprising a current value calculating section that calculates a current position and a current travel speed of said photographing lens based upon the travel amount detected by said lens travel amount detecting section, and wherein said control section determines a drive force of said lens drive section, based upon the target position and the target speed determined by said target value determining section, and the current position and the current travel speed calculated by said current value calculating section.

3. An automatic focusing device according to claim 2, wherein said lens drive section drives said photographing lens with a pulse voltage at a duty ratio corresponding to the drive force determined by said control section.

4. An automatic focusing device according to claim 2, wherein said lens drive section drives said photographing lens with a variable voltage corresponding to the drive force determined by said control section.

5. An automatic focusing device according to claim 1, wherein said locus setting section determines the optimum locus so that travel speed and acceleration of said photographing lens change continuously and become substantially zero at said target point.

6. An automatic focusing device according to claim 1, wherein said locus setting section determines the optimum locus based upon a maximum value of said defocus amount, a length of time required to move the photographing lens to said target point, and a maximum travel speed of the lens.

7. An automatic focusing device comprising:

a lens drive section that drives and automatically focuses a photographing lens;

a defocus amount detecting section that detects a defocus amount of said photographing lens;

a locus setting section that determines an optimum locus of a characteristic relating to movement of said photographing lens to a target point in advance;

a control section that determines a start point on the optimum locus based upon the defocus amount detected by said defocus amount detecting section, and controls said lens drive section to move said photographing lens along the optimum locus from the start point;

wherein said locust setting section prepares from said optimum locust a first table of lens positions on the locus with respect to a lens travel time, and a second table of travel speeds at the respective lens positions, and wherein said control section controls said lens drive section to move said photographing lens referring to said first and second tables.

8. An automatic focusing device according to claim 7, wherein said locus setting section determines the optimum locus so that travel speed and acceleration of said photographing lens change continuously and become substantially zero at said target point.

9. An automatic focusing device according to claim 7, wherein said locus setting section determines the optimum locus based upon a maximum value of said defocus amount, a length of time required to move the photographing lens to said target point, and a maximum travel speed of the lens.

10. An automatic focusing device comprising:

a lens drive section that drives and automatically focuses a photographing lens;

a defocus amount detecting section that detects a defocus amount of said photographing lens;

a locus setting section that determines an optimum locus of a characteristic relating to movement of said photographing lens to a target point in advance; and a control section that determines a start point on the optimum locus based upon the defocus amount detected by said defocus amount detecting section; and controls said lens drive section to move the photographing lens along the optimum locus from the start point, wherein said lens drive section, said locus setting section and said control section are disposed in a lens section that is detachably attached to a camera body, and wherein said defocus amount detecting section is disposed in the camera body, said automatic focusing device further comprising:

a first communication interface section that is provided in the camera body and enables communication between said defocus amount detecting section and said locus setting section; and a second communicating interface section that is provided in the lens section and enables communication between said defocus amount detecting section and said locus setting section.

* * * * *